US009323915B2

(12) United States Patent
Perez

(10) Patent No.: US 9,323,915 B2
(45) Date of Patent: Apr. 26, 2016

(54) EXTENDED SECURITY FOR WIRELESS DEVICE HANDSET AUTHENTICATION

(75) Inventor: John Scott Perez, Tampa, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 543 days.

(21) Appl. No.: 12/963,221

(22) Filed: Dec. 8, 2010

(65) Prior Publication Data
US 2012/0151210 A1   Jun. 14, 2012

(51) Int. Cl.
*H04L 9/32* (2006.01)
*G06F 21/35* (2013.01)
*G06F 21/41* (2013.01)
*G06F 21/43* (2013.01)
*H04L 29/06* (2006.01)
*H04W 12/06* (2009.01)

(52) U.S. Cl.
CPC ............ *G06F 21/35* (2013.01); *G06F 21/41* (2013.01); *G06F 21/43* (2013.01); *H04L 9/3231* (2013.01); *H04L 9/3234* (2013.01); *H04L 9/3271* (2013.01); *H04L 63/0853* (2013.01); *H04L 63/107* (2013.01); *H04W 12/06* (2013.01); *H04L 2209/80* (2013.01)

(58) Field of Classification Search
CPC ......... G06F 21/35; G06F 21/41; G06F 21/43; H04L 9/3231; H04L 9/3271; H04L 63/0853; H04L 63/107; H04L 9/3234; H04L 2209/80; H04W 12/06
USPC ............ 713/155, 168, 182, 184–186; 726/26, 726/27, 28, 29; 380/270
See application file for complete search history.

(56) References Cited

U.S. PATENT DOCUMENTS

| | | | |
|---|---|---|---|
| 6,459,988 B1 | 10/2002 | Fan et al. | |
| 6,490,443 B1 * | 12/2002 | Freeny, Jr. | 455/406 |
| 6,594,765 B2 * | 7/2003 | Sherman et al. | 726/35 |
| 6,607,136 B1 * | 8/2003 | Atsmon et al. | 235/492 |
| 6,732,278 B2 | 5/2004 | Baird et al. | |
| 7,076,797 B2 | 7/2006 | Loveland | |
| 7,610,616 B2 * | 10/2009 | Masuouka et al. | 726/5 |
| 7,672,644 B2 * | 3/2010 | Sun et al. | 455/72 |
| 7,685,629 B1 | 3/2010 | White et al. | |
| 8,005,075 B1 * | 8/2011 | Webster et al. | 370/352 |
| 8,059,542 B1 * | 11/2011 | Oroskar et al. | 370/235 |
| 8,443,425 B1 | 5/2013 | Evans et al. | |
| 8,646,060 B1 | 2/2014 | Ayed | |
| 2003/0084171 A1 | 5/2003 | De Jong et al. | |
| 2005/0105734 A1 * | 5/2005 | Buer et al. | 380/270 |
| 2007/0136573 A1 * | 6/2007 | Steinberg | 713/155 |
| 2008/0022375 A1 * | 1/2008 | Stanley | 726/5 |
| 2009/0037732 A1 | 2/2009 | Boccon-Gibod et al. | |
| 2009/0132813 A1 | 5/2009 | Schibuk | |
| 2009/0247186 A1 | 10/2009 | Ji et al. | |

(Continued)

*Primary Examiner* — Michael Chao
*Assistant Examiner* — Shu Chun Gao

(57) ABSTRACT

A mobile device is related to a user account. An agent implemented as processor instructions on a computing device sends login information to a service provider server. The service provider server compares the login information to the user account, performs a proximity check of the mobile device and the computing device, and sends authorization to the agent to approve an exchange of data with an application on the computing device. In some implementations the service provider may be an authorization service provider. Alternatively the service provider may be a wireless communications service provider and the mobile device is a cellular phone. In some implementations the mobile device is one of a card or a key fob that may include a biometric reader.

17 Claims, 6 Drawing Sheets

(56) References Cited

U.S. PATENT DOCUMENTS

| | | | |
|---|---|---|---|
| 2009/0265775 A1* | 10/2009 | Wisely et al. | 726/9 |
| 2010/0022254 A1* | 1/2010 | Ashfield et al. | 455/456.6 |
| 2011/0258689 A1 | 10/2011 | Cohen et al. | |
| 2011/0271331 A1 | 11/2011 | Adams et al. | |
| 2012/0185166 A1 | 7/2012 | Chiang et al. | |
| 2012/0196566 A1 | 8/2012 | Lee et al. | |
| 2013/0227668 A1 | 8/2013 | Mocanu | |
| 2014/0096215 A1 | 4/2014 | Hessler | |
| 2014/0380444 A1* | 12/2014 | Kelley | 726/7 |

* cited by examiner

EXTENDED SECURITY FOR WIRELESS DEVICE HANDSET AUTHENTICATION

BACKGROUND

When a person attempts remote electronic access to information, it may be difficult to determine whether the undertaking is being made by someone who is authorized to have access to the information. Security measures have evolved for authentication of accounts related to persons accessing information electronically and for non-repudiation of transactions made by persons with authenticated accounts. However, these known security measures are generally specific to the particular application being accessed. It would be desirable to have one set of security measures that could be used for access to multiple applications.

DETAILED DESCRIPTION

Figure 1:
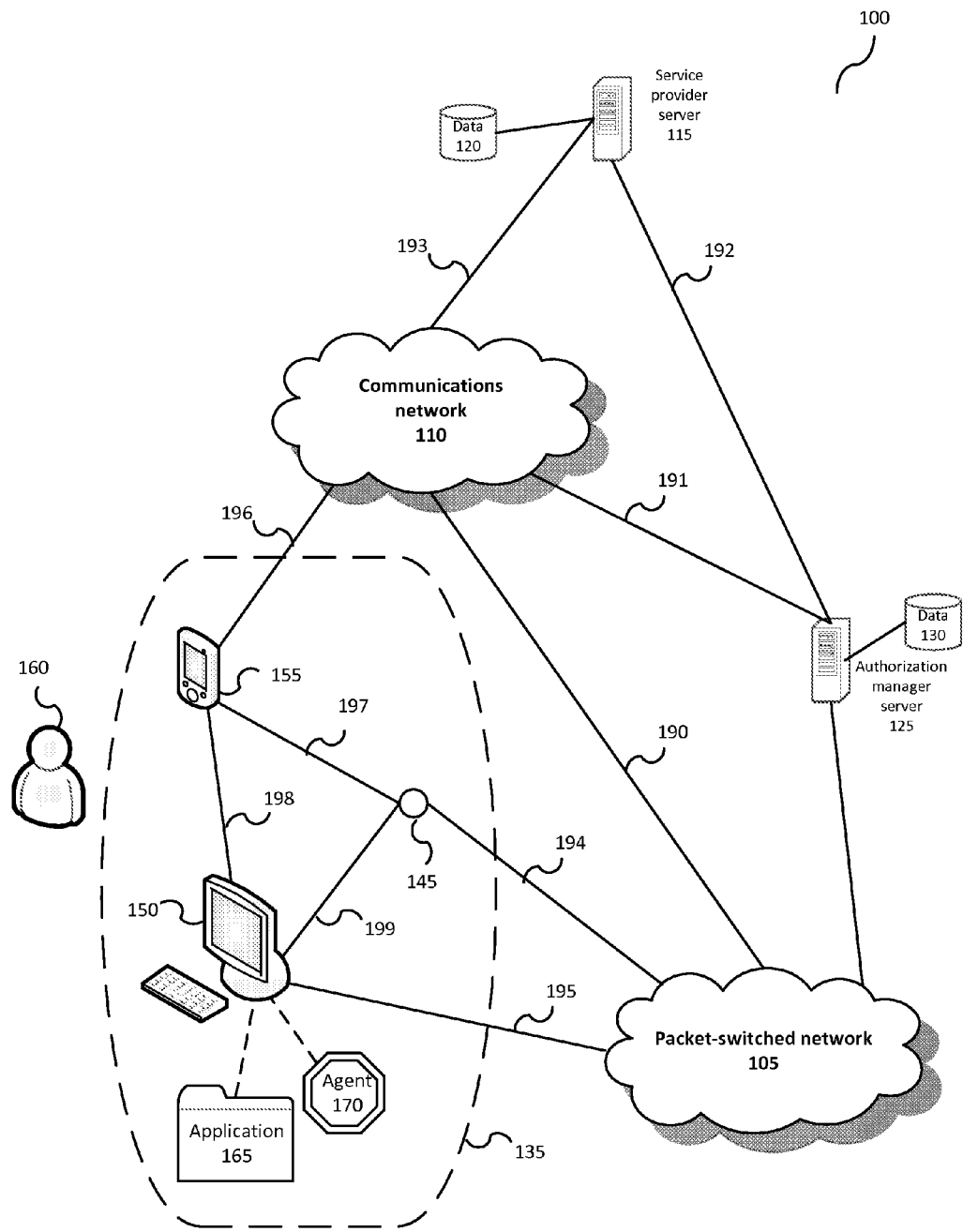
FIG. 1 illustrates an exemplary system for authorizing access to electronic information.

Many account-based transactions are now performed electronically using a machine-based mechanism such as a data terminal. At least a portion of the information exchanged between a person and the mechanism may be personal or otherwise confidential. As such, the person attempting to make the information exchange must provide at least a base level of credentials to prove at least that the account being accessed is a valid account and that the person making the attempt is a valid user of the account. Putting these requirements in information security terms, there needs to be authentication of the account and non-repudiation of the user. Non-repudiation indicates that the user has shown a sufficient level of proof of the ability to make decisions involving the account that information exchanges by the user cannot later be repudiated.

As an illustrative example, authentication at an Automated Teller Machine (ATM) may be performed by checking that the card read by the ATM is related to a valid account and that the account may be accessed using the card. Non-repudiation is implied by the fact that the person is in possession of the card and is further verified by that person knowing and entering into the ATM a Personal Identification Number (PIN) established with respect to the card.

Authentication and non-repudiation through use of a card and a corresponding PIN for the card is known. However, only a subset of applications associated with account-based electronic transactions are associated with cards. It is further undesirable to associate every such application with a card. If a person had a card for each electronic transaction application the number of cards required may become impractical for transport and use. Therefore, some other approach for authentication and non-repudiation is needed that is simpler and less cumbersome particularly as the number of expected transactions using different and non-related applications continues to increase.

An illustrative example of an area where there is an increase in applications related to electronic information exchange involving authentication and non-repudiation relates to medical treatment. There is a growing trend towards converting medical records to electronic format and making them remotely available independent of location. For instance, in a medical office with electronic files in an electronic data store, healthcare professionals may gather information about patients throughout the day on a hand-held mobile device and periodically upload or otherwise exchange the information between the mobile device and the electronic data store. Healthcare professionals may also need to access information from the electronic data store to retrieve patient data or other information, including downloading information from the data store to the mobile device. Because the mobile device and electronic data store contain predominantly confidential material it is necessary to implement strict security features for the medical office electronic data store to allow access only to authorized individuals.

From the perspective of healthcare recipients, patients may wish to access their medical records stored in the electronic data store of their primary care physician at a third-party kiosk (e.g., when in a specialist's office or when filling a prescription) and to engage in both a retrieval and updating of information stored at the primary care physician's office. To provide such remote patient record access without allowing access to unauthorized users, it is necessary to implement strict security features applicable to a distributed electronic records system.

Other representative examples of applications related to electronic information exchange involving authentication and non-repudiation include travel check-in, test center registration, and security screening at a courthouse, to name just a few. In short, there are many applications that would benefit from application-agnostic authentication and non-repudiation services.

One solution for providing application-agnostic authentication and non-repudiation services utilizes an existing network and telecommunications infrastructure, as illustrated in FIG. 1.

FIG. 1 illustrates a system 100 for providing application-agnostic authentication and non-repudiation services across large geographic regions up to and including nationwide and even global regions. System 100 includes at least one packet-switched network 105 such as the Internet or other public network or a private network, and at least one communications network 110 such as a cellular network. A service provider server 115 with data store 120 is operated by or under the authority of a communications service provider. An authorization manager server 125 with data store 130 is operated by or under the authority of an authorization service provider. While shown separately, one or more servers and data stores may be combined in practice.

Also associated with system 100 is a short range wired or wireless communications network 135 connected to packet-switched network 105. Short range network 135 may include at least one access point 145 and one or more information exchange machines such as terminals 150 in communication with access point 145 of network 135, wherein terminals 150 are generally assigned to stay within a geographical space defined by the communication range of network 135. Short range network 135 may also include one or more mobile devices 155 that enter network 135 when carried by a user 160 into the geographical space defined by the communication range of network 135 and leave network 135 when carried by user 160 out of the geographical space. A terminal 150 in short range network 135 includes at least one application 165 and a single sign-on (SSO) agent 170.

System 100 includes connections 190-199 between the various components, as discussed in more detail below.

System 100 is able to support multiple alternative approaches for authorization services. For example, some implementations use communications network 110 during the authorization process and others do not. Each approach, however, includes a single sign-on (SSO) agent 170 in communication with an authorization manager to authenticate a user account and to perform non-repudiation using a proximity check of a mobile device 155 related to the account.

The following representative example illustrates one approach for implementing authorization services in a system 100, and is presented in overview. In this approach, user 160 enters a location to interact with system 100. The location includes a terminal 150 with an application 165 that user 160 wishes to access. User 160 approaches terminal 150 and initiates application 165 by selecting it using a user interface. Application 165 on terminal 150 notifies the single sign-on (SSO) agent 170 on terminal 150 that a user requires authorization. SSO agent 170 causes a login page to be displayed to user 160. When user 160 enters the requested login information, SSO agent 170 contacts an authorization manager resident on authorization manager server 125 with a request for authorization of user 160. The authorization manager authenticates that the login information reflects a valid account and then performs a proximity check during which SSO agent 170 communicates with a mobile device 155 related to the authenticated account. If the mobile device 155 is determined to be proximate terminal 150 as user 160 requests authorization, then there is a strong likelihood that user 160 is a person authorized to make decisions regarding the authenticated account. Thus, transactions made by user 160 at terminal 150 related to the authenticated account are non-repudiated. By extension, because user 160 requested authorization related to the account to gain access to application 165, the transactions by user 160 with application 165 are also non-repudiated.

Many other approaches for implementing authentication and non-repudiation services through system 100 will become apparent as the individual elements of system 100 are discussed now in detail with reference to FIG. 1.

Packet-switched network 105 represents one network or multiple networks in communication with each other. A network 105 may be public or private. A network 105 transmits information in packet format between devices connected to network 105. One example of a packet-switched public network is the Internet.

Packet-switched network 105 may be in communication with communications network 110 as illustrated by connection 190.

Communications network 110 represents one network or multiple networks in communication with each other, and may include wired and/or wireless portions including for example undersea cable and satellite. A network 110 may be public or private or may extend across multiple public and/or private networks. Network 110 generally provides services over an extended geographic area.

Communications network 110 may provide, for example, telephone and Internet access among other services. One example of a communications network 110 in the United States is a network used by Verizon Wireless of Basking Ridge, N.J. wherein the network implements Code Division Multiple Access (CDMA) technology to provide services across the United States. Other companies use other networks which may implement other technologies such as Global System for Mobile communications (GSM), Worldwide Interoperability for Microwave Access (WIMAX), Long Term Evolution (LTE), or the like.

Service provider server 115 represents at least the computing resources of a communication service provider as related to the creation and maintenance of user accounts and access to those accounts. A communication service provider may be for example a provider of services over communications network 110. The computing resources represented by server 115 may be owned and operated by the communication service provider or by a supplier to the communication service provider.

Authorization manager server 125 represents at least the computing resources of an authorization service provider, which may be the same entity or an entity related to the communication service provider. The computing resources represented by server 125 may be owned and operated by the authorization service provider or by a supplier to the authorization service provider. During authorization, the authorization manager may request information from service provider server 115 regarding account information of a subscriber of the service provider, such as verifying that information provided by a person relates to a valid account of the service provider. Note that the authorization manager may have access directly to account information, for example, within data store 130, and therefore would not need to contact the service provider.

Computing resources, such as those represented by servers 115 and 125, include computing systems and/or devices. In general, computing systems and/or devices may employ any of a number of computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions (e.g., from a memory, a computer-readable medium, etc.,) and executes these instructions, thereby performing one or more processes, including one or more of the processes described herein. Such instructions and other information may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as data stores 120 and 130, may include various kinds of mechanisms for storing, accessing, and retrieving various kinds of information, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Continuing with the description of the elements of FIG. 1, short range network 135 is generally a network local to a geographic area, for example an office network, and is generally a high frequency and low energy network. Short range network 135 is illustrated as a wireless network, however the network may alternatively be a wired network or may use some combination of wired and wireless connections. An example of a wired connection is communication over a USB interface. Wireless connections include communication via technologies based on radio frequency or optical frequency transmission. Examples of wireless connections include communication via Wi-Fi or Bluetooth.

Security access may be required before a device may join network 135, such as through access codes or passwords.

In some implementations, network 135 includes an access point 145 for providing devices on short range network 135 access to packet-switched network 105, and for providing access between devices on short range network 135. In a network 135 that is at least partially wireless, access point 145 may be for example a wireless access point connected to a router.

Network 135 includes at least one terminal 150. As used herein, the term "terminal" denotes a computing device as described above without limitation. Terminals 150 may join and leave short range network 135 as they move into and out of range of network 135, respectively.

Short range network 135 may include one or more mobile devices 155 of users 160. A mobile device 155 may be a computing device as described above. As users 160 carrying mobile devices 155 come and go, mobile devices 155 move in and out of the geographic area covered by short range network 135. As a mobile device 155 moves into the coverage area it may join network 135. In some implementations of authorization services using system 100, mobile device 155 must join network 135. Other implementations do not require mobile device 155 to join network 135, as will be seen in examples below.

A user 160 is a person that physically approaches terminal 150 and requests authorization to perform electronic transactions. Authorization includes a proximity check of terminal 150 and a mobile device 155 in the possession of user 160, wherein the mobile device 155 is related to an account of user 160.

At least one terminal in network 135 includes an application 165. Application 165 is one of, or some combination of, software, hardware, and firmware on terminal 150. Application 165 requires authorization for users 160 seeking to exchange information with application 165. A user 160 may be denied access to portions of or all of application 165 if the user 160 fails to achieve authorization. An exchange of information may include entering, uploading, retrieving, and/or downloading information. A terminal 150 may include multiple applications 165 which may be provided by multiple vendors. Applications 165 include, but are not limited to, applications for ecommerce, employment verification, security checks, and records access. User 160 may access multiple applications 165 while present at a terminal 150. In some implementations, one authorization of user 160 may be sufficient for access to multiple applications 165. In other implementations, access to each application 165 may require individual authorization.

Single sign-on (SSO) agent 170 is one of, or some combination of, software, hardware, and firmware on terminal 150 or on a device in communication with terminal 150 (not illustrated in FIG. 1). SSO agent 170 receives requests for authorization from application(s) 165, and communicates with authorization manager server 125 for authorization services. Some examples of authorization processes are described below. In some implementations, SSO agent 170 and authorization manager server 125 are included in the same computing device, which may be terminal 150 (not illustrated in FIG. 1). In other implementations, SSO agent 170 is in communication with authorization manager server 125 through packet-switched network 105 as illustrated in FIG. 1.

Connections 190-195 represent any combination of exemplary wired or wireless transmission media. A few examples of a connection 190-195 include a cable, a combination of undersea cable and satellite transmission, radio frequency transmission, and a combination of cable, optical fiber, and cellular network transmission.

Connection 196 represents an exemplary wireless connection between a communications network 110 and mobile device 155. For example, mobile device 155 may communicate over a cellular network such as a CDMA or GSM network that is part of communications network 110. As discussed above, mobile device may also communicate over short range network 135.

Connection 197 represents an exemplary wired or wireless connection between mobile device 155 and access point 145. Connection 198 represents a wired or wireless connection between mobile device 155 and terminal 150. A wired connection may be for example a USB cable or another serial or parallel protocol cable. A wireless connection may be for example a Bluetooth or WiFi connection, or other connection using a radio frequency wireless protocol. A wireless connection may instead use other frequencies such as infrared, ultrasound or visible light. Connection 197 and/or 198 may represent multiple wired and/or wireless options for connecting mobile device 155. In some implementations, connection 197 and/or 198 may be a receptacle for a mobile device 155 removable personality card, or for a memory card or the like.

Connection 199 represents an exemplary wired or wireless connection between terminal 150 and access point 145, as well as connections between other terminals 150 and access points 145 of short range network 135. Wired and wireless access in network 135 was described above with respect to connections 197 and 198.

The combination of connections 190-199 may vary based on the version of system 100 implemented and various exemplary illustrations of implementations are illustrated. Having described in detail the components of system 100, some examples are now provided of authorization using system 100.

Figure 2:
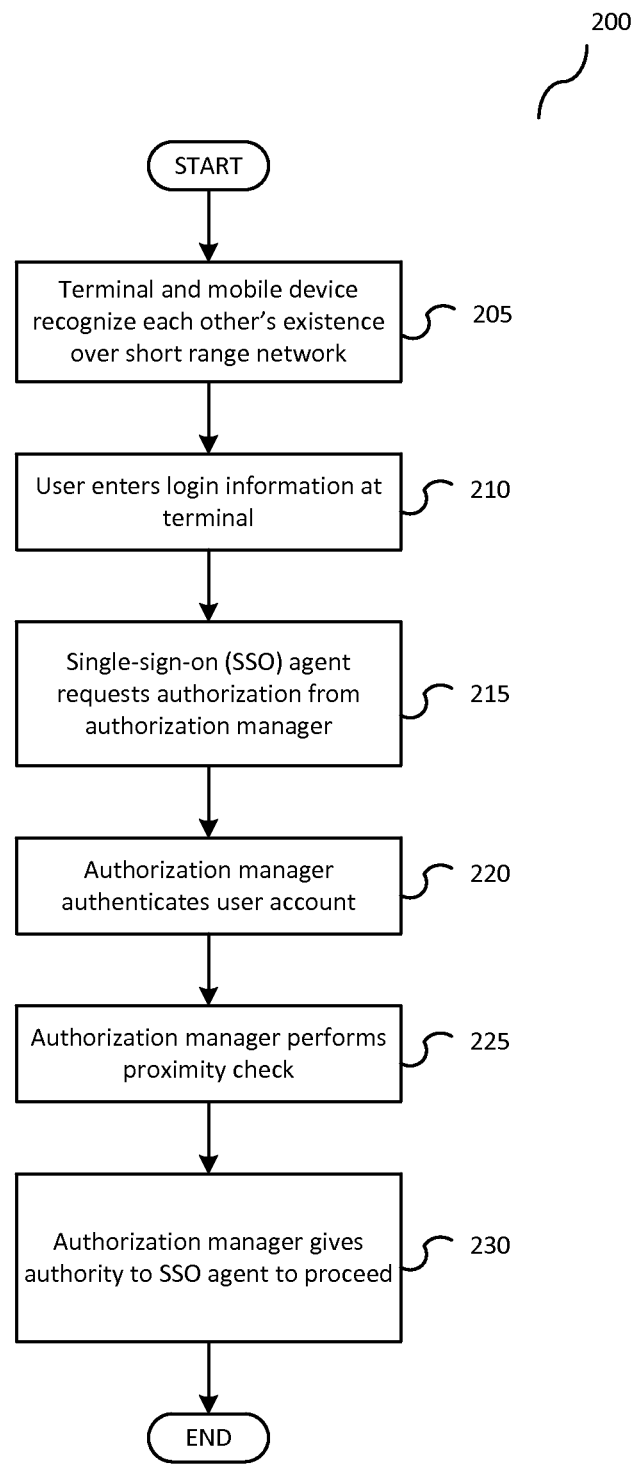
FIG. 2 illustrates an exemplary process for authorizing a user to access information at a terminal.
Figures 4A, 4B:
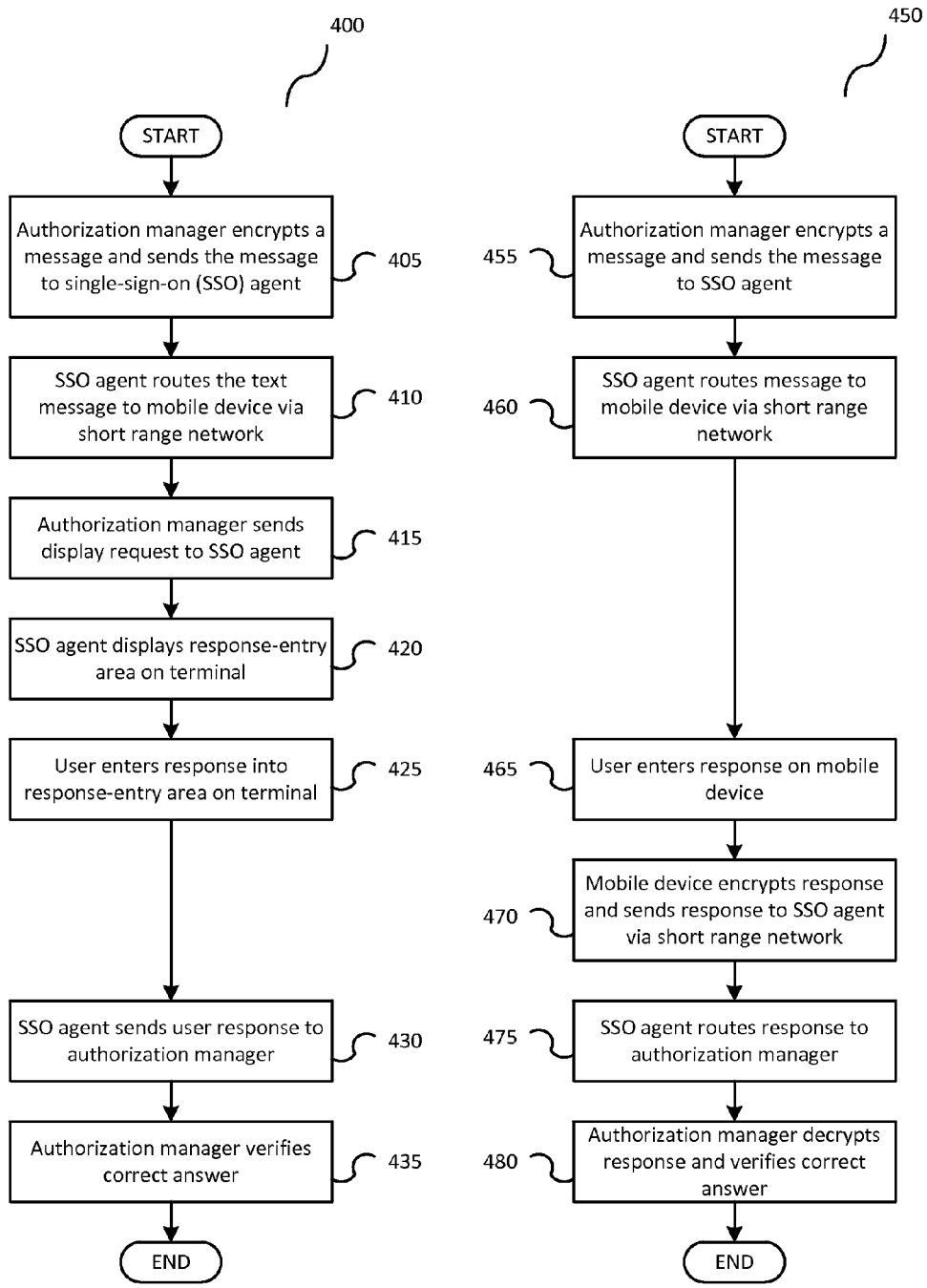
FIG. 4A illustrates a further exemplary process for performing a proximity check of a user with respect to a terminal.
FIG. 4B illustrates an additional exemplary process for performing a proximity check of a user with respect to a terminal.
Figure 5:
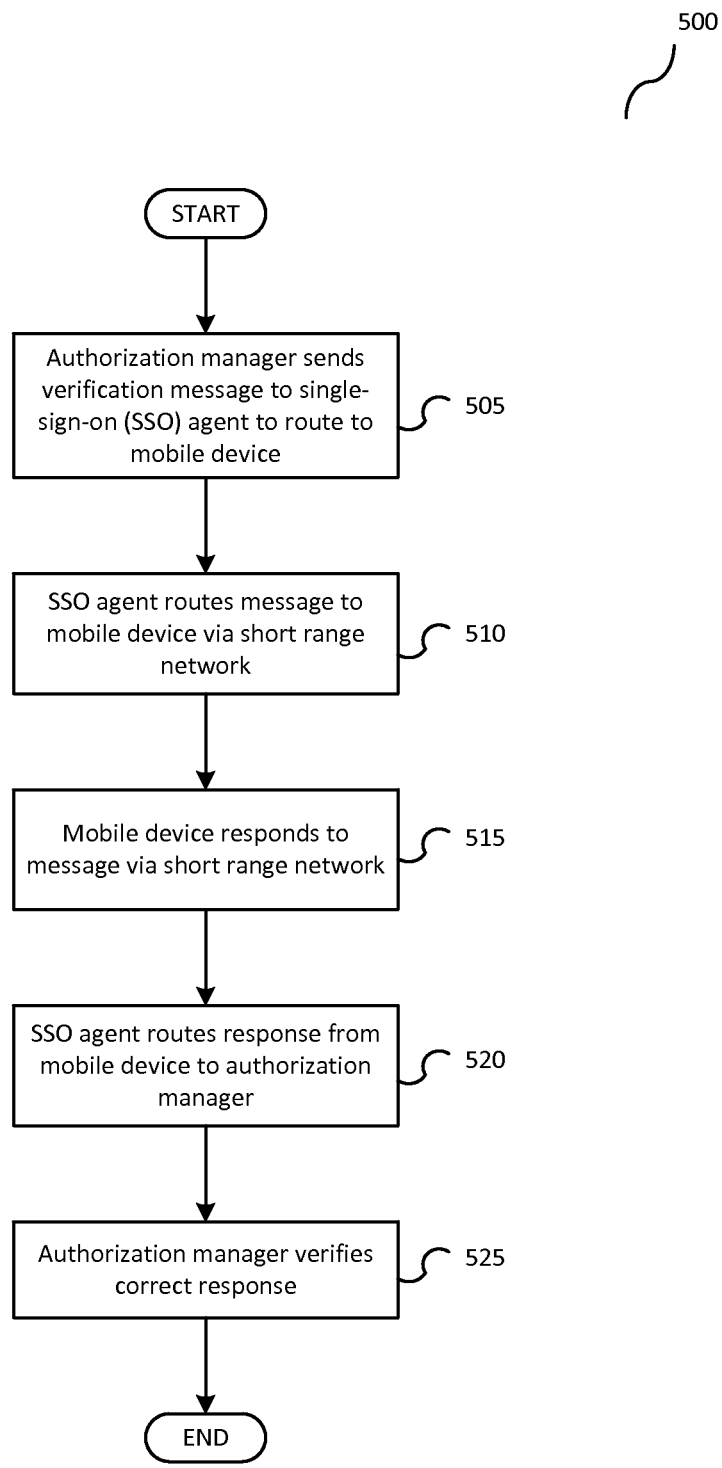
FIG. 5 illustrates a further exemplary process for performing a proximity check of a user with respect to a terminal.
Figure 6:
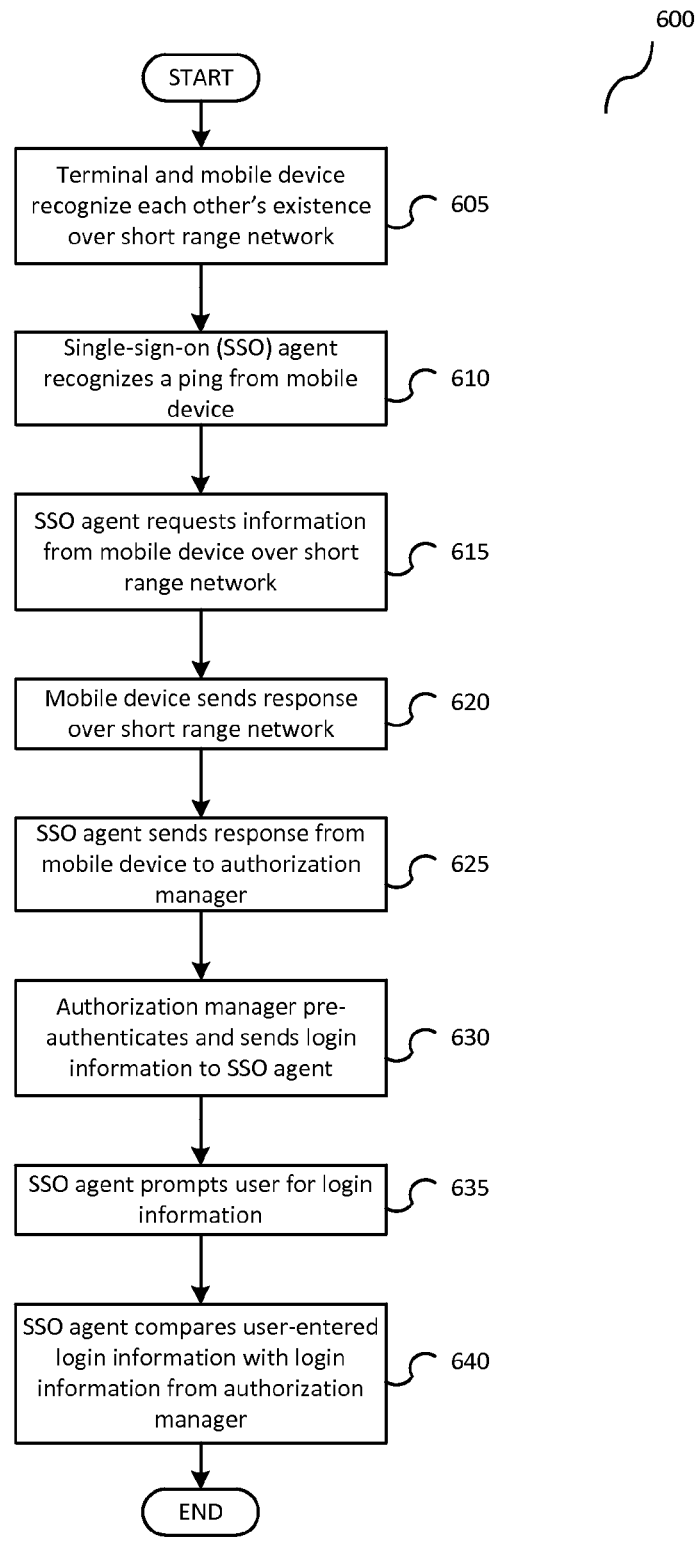
FIG. 6 illustrates an exemplary process for pre-authorizing a user to access information at a terminal.

FIGS. 2-6 illustrate exemplary implementations for providing authorization services using system 100. FIG. 2 is a flow chart describing an exemplary user 160 interaction with system 100. FIGS. 3A, 3B, 4A, 4B, and 5 expand on the concept illustrated in FIG. 2 and are flow charts describing some of the many ways that a proximity check used for non-repudiation may be performed in system 100 as part of the authorization process. FIG. 6 is a flow chart describing another exemplary user 160 interaction with system 100. In each of FIGS. 2-6, communication between the authorization manager and SSO agent 170 through packet-switched network 105 may be implemented as including communication over connection 195 directly to terminal 150 or as communication over connections 194 and 199, for example. Other configurations may alternatively be implemented.

FIG. 2 illustrates an exemplary process 200 that allows a user 160 to access an application 165 and receive authorization to exchange information with the application 165. In process 200 starting at block 205, when a user 160 approaches terminal 150, terminal 150 and mobile device 155 recognize each other's existence over short range network 135.

As mentioned above, network 135 may be wired or wireless, and the connection between mobile device 155 and devices in network 135 may be wired or wireless. In one exemplary implementation short range network 135 is at least in part a wired network and mobile device 155 is plugged into terminal 150. In this example, at block 205 terminal 150 and mobile device 155 perform standard handshaking communications through a wired connection to recognize each other. In another exemplary implementation short range network 135 is a Wi-Fi wireless network. In this example, at block 205 as mobile device 155 moves into range of Wi-Fi access point 145, mobile device 155 and Wi-Fi access point 145 perform standard handshaking communications to recognize each other. Continuing with this example, mobile device 155 and terminal 150 are able to recognize each other's existence by joint membership in the Wi-Fi network.

At block 210, user 160 launches application 165 on terminal 150 (if necessary) and enters any requested login information at terminal 150. Login information may be requested for access to application 165 and further information may be requested for starting the process of authorization. For example, user 160 may be asked for a user name and password to access application 165 and previously, subsequently, or concurrently be asked for identification (e.g., name and telephone number) related to a mobile device 155 for authorization. Thus, from the perspective of user 160, access to application 165 may appear to be sequential with or parallel to authorization through SSO agent 170. In some implementations, SSO agent 170 may be transparent to user 160.

In one exemplary implementation, user 160 logs in to application 165 and then application 165 passes user 160 to SSO agent 170. SSO agent 170 then presents to user 160 a request for further information to be used for authorization. In a second exemplary implementation, SSO agent 170 concurrently presents to user 160 requests for login information for application 165 as well as for authorization. In a third exemplary implementation, SSO agent 170 must authorize user 160 before agent 170 passes user 160 to application 165 for logging in to application 165. In a fourth exemplary implementation, application 165 and SSO agent 170 present requests for information to user 160 in separate areas of terminal 150 display. User 160 selects whether to log in to application 165 or to request authorization through SSO agent 170.

As can be seen, SSO agent 170 and application 165 work together in some manner to get information from user 160 both for logging into application 165 and for requesting authorization.

At block 215, after user 160 has entered the requested login information, SSO agent 170 requests authorization from the authorization manager in the form of a communication to authorization manager server 125. At block 220, the authorization manager authenticates that the login information provided by user 160 for the purpose of authorization relates to a valid account, and that at least one mobile device 155 is related to the account.

At block 225, having authenticated the login information, the authorization manager proceeds to perform a proximity check to verify that a mobile device 155 related to the valid account is proximate terminal 150. The proximity check is based on the assumption that if user 160 has both login information for a valid account and a mobile device 155 related to the account, then user 160 is an authorized person on the account. An authorized person on an account may not repudiate transactions made by that person related to that account. By extension, if user 160 is deemed an authorized person on an account, and user 160 requested the authorization in order to access application 165, then in theory user 160 may not repudiate transactions with application 165. In sum, the proximity check is one way to verify that a real person with a real account is physically near terminal 150. This provides protection against remote computers gaining access to application 165.

At block 230, if the proximity check indicates that a person with correct login information for a valid account and a mobile device 155 related to that account are proximate terminal 150, the authorization manager provides SSO agent 170 with authority to proceed in the form of a communication from authorization manager server 125. SSO agent 170 then allows user 160 to access application 165. For example, in an implementation in which user 160 first enters account information into terminal 150 for authorization, SSO agent 170 may pass user 160 to application 165 for login after receiving authority from the authorization manager. After block 230, process 200 ends.

Figures 3A, 3B:
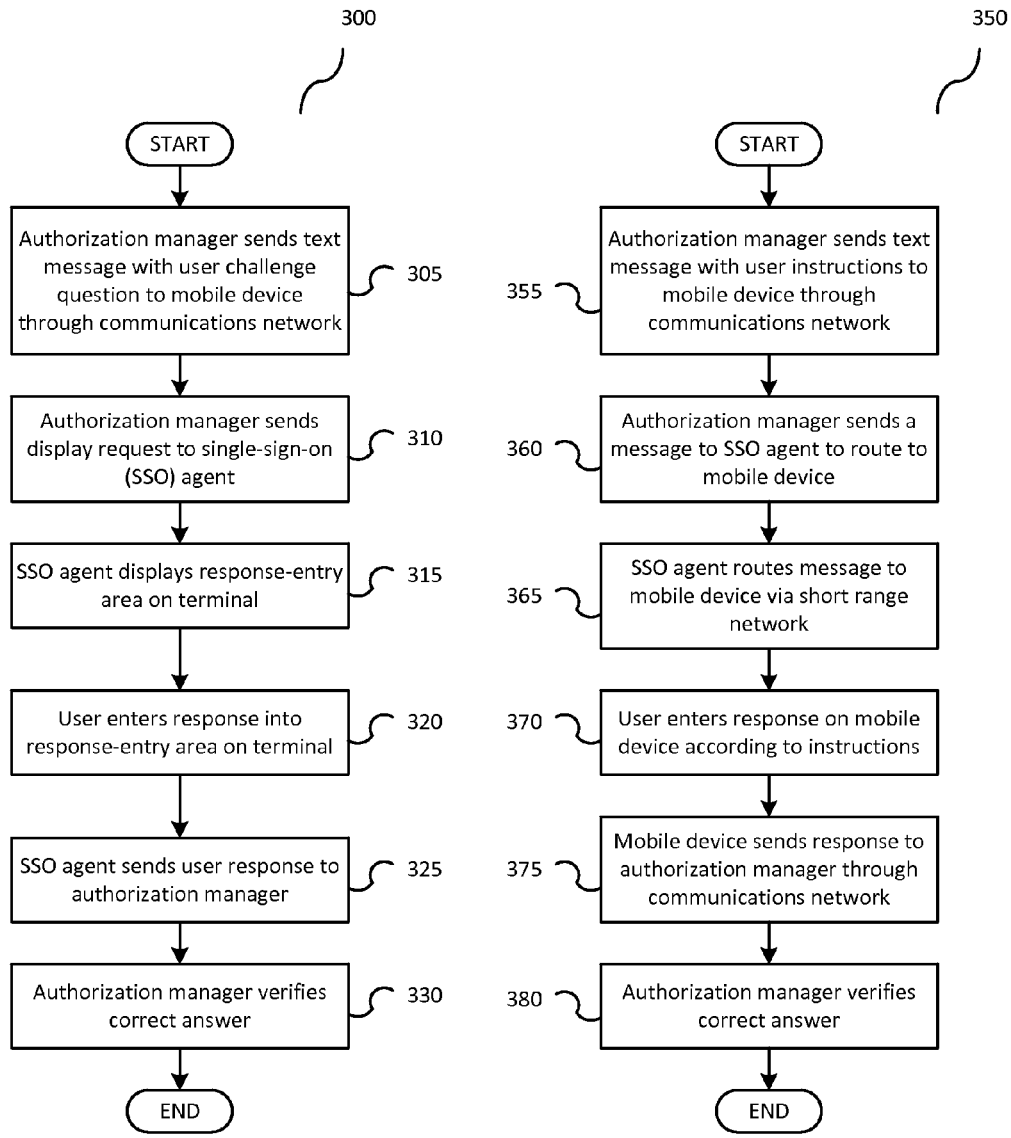
FIG. 3A illustrates an exemplary process for performing a proximity check of a user with respect to a terminal.
FIG. 3B illustrates an additional exemplary process for performing a proximity check of a user with respect to a terminal.

The proximity check described with respect to block 225 of process 200 may be performed in many different ways. FIGS. 3A and 3B illustrate implementations in which the authorization manager performs a proximity check in part by causing a message to be sent via a communications network 110 to the mobile device 155 related to the authenticated account. In FIG. 3A, a flow chart describes user 160 responding to the message by entering information at terminal 150. In FIG. 3B, a flow chart describes user 160 responding to the message by entering information on the mobile device 155.

FIG. 3A illustrates an exemplary process 300 for a proximity check using a text message. Under process 300 connections such as connections 197 and 198 are not utilized, instead relying on connection 196 between communications network 110 and mobile device 155. Process 300 starts at block 305 when the authorization manager causes a text message such as short message service (SMS) text or multimedia messaging service (MMS) text to be sent to mobile device 155 via communications network 110 over connection 196. The text message may be, for example, a challenge question. A challenge question may be, for example, a predefined question related to the authenticated account, or may be as simple as a word displayed on mobile device 155. Importantly, the challenge question presented should be selected at least semi-randomly from a pool of challenge questions or created at least semi-randomly from the set of available text characters. In this way, theoretically, only a person viewing the mobile device 155 display will see the challenge question.

At block 310, the authorization manager sends a request to SSO agent 170 via packet-switched network 105 to display a response-entry area on terminal 150. At block 315, SSO agent 170 provides a response-entry area on terminal 150. The response-entry area is sized appropriately to accept the answer to the challenge question.

At block 320, user 160 enters the answer to the challenge question received at mobile device 155 into terminal 150. The answer may be a predefined answer to a predefined question related to the authenticated account. In an implementation where the challenge question is simply a word, user 160 enters the word at terminal 150. It should be understood that the challenge question may be any text and is not necessarily a question, and that if the challenge question is a question, it may be any question that user 160 has a reasonable chance of being able to answer. SSO agent 170 may include an option for user 160 to request a different challenge question.

At block 325, SSO agent 170 sends the response entered at terminal 150 by user 160 to the authorization manager via packet-switched network 105, and at block 330, the authorization manager determines whether the response was the correct answer to the challenge question.

Because the challenge question is received at mobile device 155 and answered at terminal 150, if the answer is correct then proximity of mobile device 155 to terminal 150 is potentially proven. However, to prevent correct guessing by remote computing devices, the number of challenge questions should be substantially greater than the maximum number of answer attempts allowed.

After block 325, process 300 ends, and, for example, the authorization manager may send authorization to SSO agent 170 to proceed if the response was the correct answer to the challenge question as was described with respect to process 200 at block 230. The proximity check of process 300 may be quickly implemented using the infrastructure of existing communications networks 110 which are cellular networks, requiring no modification to existing cellular phones, and requiring only the implementation of SSO agent 170 and an authorization manager.

FIG. 3B illustrates another exemplary process for a proximity check using a text message, process 350. In process 350 connection 196 between mobile device 155 and communications network 110 is used, and for example one or more of connections 197-199 between mobile device 155 and a component of network 135 is used. Process 350 starts at block 355 when the authorization manager causes a text message such as SMS or MMS text to be sent to mobile device 155 via communications network 110 over connection 196. The text message may be, for example, instructions for user 160 to follow. The instructions may be, for example, to wait for the next message and then enter into mobile device 155 the word in the message spelled backwards.

At block 360, the authorization manager sends a second message, to SSO agent 170 via the packet-switched network. The second message is for SSO agent 170 to forward to mobile device 155 over short range network 135. At block 365, SSO agent 170 routes the message from the authorization manager to mobile device 155 via short range network 135, for example via one or more of connections 197-199. The message may be, in the example above, a word.

At block 370, user 160 enters a response into mobile device 155 according to the instructions received at block 355. In the example above, user 160 may enter the word from the message backwards-spelled into mobile device 155 in the form of an instant message.

At block 375, mobile device 155 sends the response to the authorization manager through communications network 110 via connection 196. At block 380, the authorization manager determines whether the response was correct according to the instructions and the message.

A correct response indicates that mobile device 155 received the second message routed by SSO agent 170 because the second message was necessary to formulate a correct answer. The message was sent by SSO agent 170 via short range network 135, thereby indicating that mobile device 155 is proximate terminal 150.

After block 380, process 350 ends, and, for example, the authorization manager may send authorization to SSO agent 170 to proceed if the response was the correct response as was described with respect to process 200 at block 230. The proximity check of process 350 may be quickly implemented using the infrastructure of existing communications networks 110 which are cellular networks, using existing Bluetooth- or WiFi-enabled cellular phones, and requiring only the implementation of an application on the cellular phones, an SSO agent 170, and an authorization manager.

Because text messages may be inherently insecure, it may be desirable to avoid performing proximity checks using open text messaging over communications network 110. The use of encrypted text messages is one alternative that solves this issue.

Encryption may be implemented by, for example, using the pseudo-random number (PN) long code related to mobile device 155 along with a Walsh code and the electronic serial number (ESN) of the mobile device 155. In another example, mobile device 155 and SSO agent 170 and/or the authorization manager may include X.509 certificates to encrypt all information exchanged over short range network 135, packet-switched network 105, and communications network 110.

Another alternative for avoiding open text messaging is to not use communications network 110 during authorization. FIGS. 4A and 4B provide exemplary implementations of proximity checks that do not use network 110 and instead use short range network 135 to exchange encrypted messages. In these implementations connections in short range network 135 are used for communication between mobile device 155 and terminal 150, for example via one or more of connections 197-199. Connection 196 is not used because mobile device 155 is not communicated with through communications network 110. In the implementation illustrated by FIG. 4A, user 160 is prompted to enter a response at terminal 150. In the implementation illustrated by FIG. 4B, user 160 is prompted to enter a response on mobile device 155.

In the exemplary processes of FIGS. 4A and 4B, mobile device 155 and SSO agent 170 are configured with encryption and decryption capabilities, and further configured to exchange encrypted messages with each other over the implemented short range network 135. In some implementations a known messaging protocol may be used for message exchange. In some implementations a network-specific protocol may be used for network 135.

FIG. 4A illustrates an exemplary process 400 for a proximity check using an encrypted message sent over short range network 135. Process 400 starts at block 405 when the authorization manager generates and encrypts a message and sends the encrypted message via packet-switched network 105 to SSO agent 170 to route to mobile device 155. The message may be, for example, a challenge question as described above. At block 410, SSO agent 170 routes the message to mobile device 155 via short range network 135, for example via one or more of connections 197-199.

At block 415, the authorization manager sends a request to SSO agent 170 via packet-switched network 105 to display a response-entry area on terminal 150. At block 420, SSO agent 170 provides a response-entry area on terminal 150.

At block 425, user 160 enters the answer to the challenge question in the response-entry area at terminal 150 as discussed above.

At block 430, SSO agent 170 sends the response entered by user 160 to the authorization manager via packet-switched network 105, and at block 435, the authorization manager determines whether the response was the correct answer to the challenge question.

Because the encrypted message is sent from SSO agent 170 to mobile device 155 over short range network 135 and the answer is entered at terminal 150, a correct answer indicates proximity of mobile device 155 to terminal 150. Proximity is shown in two ways in the example of process 400. First, the question was received at mobile device 155 over short range network 135 indicating that mobile device 155 was in the geographic area covered by network 135. Second, the question was received at mobile device 155 while the answer was entered at terminal 150, indicating that mobile device 155 was near terminal 150 when the question was received. Point two assumes that there was not a long delay before the question was answered. A timeout period may be implemented in SSO agent 170 such that, for example, if the question is not answered before the timeout, any answer will be ignored or marked as incorrect.

After block 435, process 400 ends, and, for example, the authorization manager may send authorization to SSO agent 170 to proceed if the response was the correct answer to the challenge question as was described with respect to process 200 at block 230.

FIG. 4B illustrates another exemplary process, namely process 450, for a proximity check using an encrypted message sent over short range network 135. Process 450 starts at block 455 when the authorization manager generates and encrypts a message and sends the encrypted message via packet-switched network 105 to SSO agent 170 to route to mobile device 155. The message may be, for example, instructions for user 160 to follow. At block 460, SSO agent 170 routes the message to mobile device 155 via short range network 135, for example via one or more of connections 197-199.

At block 465, user 160 enters a response into mobile device 155 according to the message received at block 460. Comparing process 450 to process 350, process 450 may include, but does not require, a second message sent to mobile device 155 to establish proximity. In process 350, instructions were sent through communications network 110 via connection 196 at block 355 and the user 160 response entered at block 370 was sent back through communications network 110 via connection 196. Thus, to determine proximity, another message necessary for user 160 to respond correctly was sent at block 365 by SSO agent 170 to mobile device 155 over short range network 135, for example via one or more of connections 197-199. In contrast, in process 450, the message is sent by SSO agent 170 to mobile device 155 over short range network 135 at block 460, which establishes proximity in itself. Therefore, a second message may be used but is not necessary for determining proximity.

At block 470, mobile device 155 encrypts the response and sends the response to SSO agent 170 via short range network 135, for example via one or more of connections 197-199. At block 475, SSO agent 170 routes the encrypted response to the authorization manager over packet-switched network 105 and at block 480 the authorization manager decrypts the response and determines whether the response was correct according to the instructions.

After block 480, process 450 ends, and, for example, the authorization manager may send authorization to SSO agent 170 to proceed if the response was the correct response as was described with respect to process 200 at block 230.

The examples of FIGS. 4A and 4B illustrate authorization without using communications network 110, thereby freeing network 110 from the potential additional network traffic required for authorization at multitudes of terminals 150.

The examples of FIGS. 3A, 3B, 4A, and 4B illustrate processes for a proximity check that involve some form of user 160 input in response to a message. Some examples were provided in which a question was delivered to mobile device 155 and an answer entered at terminal 150. However, this is not limiting, and the question could have been presented at terminal 150 and the answer entered at mobile device 155. In some implementations, a proximity check may be performed without user 160 input.

FIG. 5 illustrates an exemplary process 500 for a proximity check with no user 160 input. Process 500 starts at block 505 when the authorization manager sends a verification message to SSO agent 170 to route to mobile device 155. The message includes a request for information known to mobile device 155. For example, the message may be a query of the electronic serial number (ESN) assigned to the mobile device 155. At block 510, SSO agent 170 routes the message to mobile device 155 via short range network 135, for example via one or more of connections 197-199.

At block 515, mobile device 155 sends a response to the message via short range network 135 to SSO agent 170, for example via one or more of connections 197-199. A response to the query message of the previous example would be the ESN of the mobile device 155. At block 520, SSO agent 170 routes the response from mobile device 155 to the authorization manager via packet-switched network 105.

At block 525, the authorization manager determines whether the response was the correct response. In the previous example, the authorization manager would check the ESN provided by mobile device 155 against the ESN of any valid mobile devices 155 related to the authenticated user 160 account.

After block 525, process 500 ends, and, for example, the authorization manager may send authorization to SSO agent 170 to proceed if the response was the correct response as was described with respect to process 200 at block 230.

FIGS. 3A, 3B, 4A, 4B and 5 illustrate exemplary processes for performing a proximity check for non-repudiation during authorization, for example after authentication as illustrated in the exemplary process of FIG. 2. In another implementation, a proximity check and pre-authentication may be performed even before user 160 logs in at terminal 150.

FIG. 6 illustrates a process 600 for performing a proximity check and pre-authentication before user 160 enters login information. Process 600 starts at block 605 as a user 160 approaches terminal 150 and mobile device 155 and terminal 150 recognize each other, for example as described above for wired and wireless short range networks 135.

At block 610, SSO agent 170 recognizes a ping from mobile device 155. The term "ping" herein denotes a message sent by mobile device 155, perhaps periodically, for the purpose of identifying mobile device 155 to receivers of the ping. A ping may be transmitted via radio frequency, infrared, optical frequency, or other frequency and contains information formatted in a known way. For example, a ping may be a periodic message from a cellular phone to a communications network 110 for establishing identity and location. From the ping, SSO agent 170 has enough information to recognize that mobile device 155 is a device that potentially may be used for authorization.

At block 615, SSO agent 170 sends a request for information to mobile device 155 over short range network 135, for example via one or more of connections 197-199. The request may be, for example, a request for the ESN of mobile device 155 or a request for a token such as a soft token stored in the memory of mobile device 155. At block 620, mobile device 155 sends a response to the request for information to SSO agent 170 over short range network 135, for example via one or more of connections 197-199. The request and response may be encrypted.

At block 625, SSO agent 170 sends the information received from mobile device 155 to the authorization manager in the form of a message to authorization manager server 125 via packet-switched network 105. In the example above, the response may include the ESN of mobile device 155 or the token from the memory of mobile device 155.

At block 630, the authorization manager determines whether there is a valid user account related to mobile device 155 based on the information received from mobile device 155 as routed by SSO agent 170. If there is a valid user account, the authorization manager sends login information for the user account to SSO agent 170.

At block 635, SSO agent 170 provides a prompt at terminal 150 for user 160 to enter login information at terminal 150. At block 640, after user 160 enters login information as prompted, SSO agent 170 compares the login information provided by user 160 to the user information received from the authorization manager. If the comparison indicates a match, SSO agent 170 may then pass control to application 165.

After block 635, process 600 ends. In the example illustrated by process 600, the proximity check was inherently performed during the pre-authentication when SSO agent 170 requested and received the ESN from mobile device 155 at blocks 610 and 615. The ESN allowed the authorization manager to find an account related to mobile device 155 and provide pre-authentication that there was a valid account. SSO agent 170 performed the final authentication by comparing the user-entered login information to the expected login information received from the authorization manager.

The examples of proximity checks described above are not exhaustive. Another way to perform a proximity check includes using terrestrial or satellite positioning to determine whether the current or last known location of a mobile device 155 is consistent with respect to time and space with the same mobile device 155 being proximate terminal 150. Yet another proximity check includes gathering biometric data from user 160 and comparing the gathered data to stored data related to an account of user 160.

As can be seen from exemplary processes 200-600, there are multiple ways to perform authorization. For example, some implementations may use communications network 110, some implementations may require user 160 input at terminal 150 while others may require user 160 input at mobile device 155, and some implementations may use encryption. As can also be seen from the exemplary processes 200-600, authentication and non-repudiation may be performed in parts, and in any order. Further, the authorization manager may be partially or completely implemented at terminal 150. SSO agent 170 and the authorization manager may be one set of software, and in some implementations may be part of application 165.

Through authorization as described, a person having a valid account with a service provider and a valid mobile device 155 associated with the account may be provided access to any application that has been linked with single sign-on agent 170. Thus, the person may more easily perform many electronic transactions through many applications each day.

An added benefit from implementations where authorization is performed without accessing communications network 110 is that the authorization traffic does not burden communications network 110 even when mobile device 155 is a cellular phone that ordinarily communicates over network 110. Instead, authorization traffic is on packet-switched network 105 and short range network 135, both of which may be more capable than network 110 of handling the additional traffic.

Many people would like to have the benefit of an authorization service enabled as described. People having a cellular phone and an account with a cellular provider would be able to use the account with associated login information for authentication. Because most people carry their cellular phones on their persons the cellular phone may be used for the proximity check performed for non-repudiation. Thus, cellular service is one enabler for authorization service.

Some people, however, do not have cellular phones, or have cellular phones that are limited to 911 emergency calls such that there is no cellular account related to the cellular phone. These people may also like to have the benefit of an authorization service enabled as described, and indeed may be required to have a way to receive authorization. For example, if the government institutes a medical initiative requiring all people to be authorized before receiving medical care, those without cellular phones would need a different sort of mobile device 155 to take advantage of the authorization services.

One mobile device 155 that could be used for authorization is an authorization card related to an account with an authorization services provider. The authorization card may include a power source. The power source may be provided internally, for example with a battery. Alternatively, the power source may be provided externally, for example with a cable or a charging pad, or using solar or kinetic energy. The authorization card may include an on/off selector to conserve energy.

The authorization card includes the ability to communicate with terminal 150. In some implementations, the authorization card includes an interface to short range network 135. In other implementations, the authorization card includes a physical connection point such as pin pads that connect with pins on terminal 150. In other implementations, the authorization card uses non-contact access such as an inductive coupling. A protocol for communication with terminal 150 is included on the authorization card as appropriate for the interface.

For implementations in which the authorization card must be physically in contact with terminal 150 to communicate with terminal 150, proximity is inherent and authorization therefore does not require a proximity check. Of course, a proximity check may be performed anyway for added security.

For implementations in which the authorization card need not be physically in contact with terminal 150 to communicate with terminal 150, a proximity check is performed. For these implementations, the authorization card includes an interface for short range network 135 and further includes capability for secure communications such as through encoding and/or encryption. For example, the authorization card may include an ESN and the capability to encode and decode messages by modulating and demodulating using CDMA and a Walsh code. Additionally or alternatively, the authorization card may include an X.509 certificate or the like for encryption and decryption of messages.

In some implementations, the authorization card may include a biometric reader, such as a fingerprint reader, DNA marker reader, or chemical detection circuit. For an implementation including a biometric reader, the baseline biometric data may be recorded on the authorization card for self-verification that the card is in the hands of the registered owner of the card. Additionally or alternatively, the baseline biometric data may be stored at authorization manager server data store 130 for authorization during the proximity check that the card is in the hands of the registered owner of the card. User 160 may be prompted during the proximity check to touch a particular spot on the authorization card for biometric information to be gathered. Once the biometric information is gathered, it is compared to stored biometric information, whether stored on the authorization card or stored in data store 130, to verify that the information matches to some predefined confidence level. For example, a thumbprint may be considered a close enough match if four markers match the stored thumbprint.

In some implementations, an authorization card may include terrestrial or satellite positioning capability, and the authorization card may track its own location. The location of the authorization card may additionally or alternatively be tracked by the authorization manager by receiving information from the terrestrial or satellite positioning network or by receiving information from the authorization card as it moves through a network related to the authorization manager.

Authorization for information exchanges using an authorization card would be performed in a fashion similar to those described above for exchanges using other types of mobile devices 155, with the exception that authorization would not include communications over communications network 110 via connection 196 as described with respect to the processes of FIGS. 3A and 3B.

The term authorization card was used in the examples above for convenience of discussion and not as a limiting description. The authorization card may instead be formed as, for example, a fob for a keychain, a link in a watchband, or an item of jewelry.

Because authorization does not require that the authorization card or indeed any other mobile device 155 communicate over a cellular network, it is clear that mobile device 155 may be a wide variety of devices. Of course, mobile device 155 may be a cellular phone. In fact, mobile device 155 may be a cellular phone that is configured to communicate over one type of communications network 110 but may be authorized by an authorization manager related to another type of communications network 110. For example, a person may have an account with a first cellular communications service provider and a cellular phone corresponding to that account that communicates over the network of the first cellular communications service provider using GSM technology. In this example, the person may be authorized by a second cellular communications service provider that offers communication services over a network using CDMA technology. The second provider need only have access through packet-switched network 105 to the first service provider server 115 to query server 115 for authentication of account information. Additionally, as mentioned previously, the second provider may be a provider of authorization services only and not a provider of cellular communications services.

CONCLUSION

A system has been described in which a mobile device is used in a process of authorizing a person to access an application, wherein authorization includes authentication and non-repudiation. Authentication includes verifying that a valid account exists related to the login information provided by the person. Non-repudiation includes using a proximity check of a mobile device related to the account, by checking for proximity of the mobile device to a terminal containing the application. Authorization is not limited to authentication and non-repudiation and may include further security measures.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:
1. A method, comprising:
receiving login information from an agent on a computing device;

determining from the login information that a valid account exists and is related to a mobile device;

performing a proximity check between the mobile device and the computing device after the valid account is determined, the proximity check including:

sending a message with user instructions to the mobile device via a first network, and receiving a reply including a correct answer based on the user instructions of the message via a second network, the correct answer being different than the user instructions; and providing authorization to the agent to approve an exchange of data with an application on the computing device when the mobile device is determined by the proximity check as proximate to the computing device.

2. The method of claim 1, wherein the mobile device is determined as proximate to the computing device when the reply including the correct answer to a challenge question of the message presented by the mobile device is received.

3. The method of claim 1, wherein the first network is a cellular communications network, and wherein the cellular communications network is not utilized by the computing device and mobile device to communicate.

4. The method of claim 1, wherein the first network is a wireless network over which a service provider provides a communication service to the mobile device using a cellular communication protocol, wherein the mobile device is a cellular phone.

5. The method of claim 1, wherein the proximity check includes:

encoding a challenge question using a Walsh code and a pseudo-random noise (PN) long code;

sending the message to the mobile device by providing the encoded challenge question to the mobile device via the first network;

receiving the reply via the second network from the computing device as submitted in response to the encoded challenge question;

verifying that the reply was a correct response to the encoded challenge question; and determining that the mobile device is proximate to the computing device when the reply is the correct response.

6. The method of claim 4, wherein the proximity check includes:

encrypting a request for a token listed in the valid account;

providing the request in the message to the mobile device;

receiving from the agent a reply message in the reply including a token relayed by the agent from the mobile device, wherein the reply message is responding to the request for the token listed in the valid account;

verifying that the token relayed by the agent matches the token listed in the valid account; and determining that the mobile device is proximate to the computing device when the token relayed by the agent matches the token listed in the valid account.

7. The method of claim 6, further comprising:

encrypting the request for the token listed in the valid account using a Walsh code and a pseudo-random noise (PN) long code.

8. A method, comprising:

receiving by an agent implemented as processor instructions on a computing device login information related to an account;

sending by the agent the login information over a packet-switched network to a provider of authorization services;

receiving by the agent a response from the authorization service provider requesting a proximity check of a mobile device related to the account, wherein the response includes a message with user instructions;

performing by the agent a proximity check between the mobile device and the computing device after receiving the response, the proximity check including: routing the message with the user instructions to the mobile device via a short range network, and receiving a reply including a correct answer based on the user instructions of the message from the mobile device via the short range network or from the computing device, the correct answer being different than the user instructions;

sending by the agent a notice to the authorization service provider indicating proximity of the mobile device based on the proximity check; and receiving by the agent authorization from the authorization service provider to approve information exchange with an application.

9. The method of claim 8, wherein the message includes a challenge question for presentation by the mobile device, wherein the message includes a challenge question that is encrypted using a Walsh code and a pseudo-random noise (PN) long code, and further comprising:

causing the mobile device to present the challenge question, receiving the reply from the mobile device submitted in response to the presented challenge question, wherein the reply is encrypted using the Walsh code and the PN long code.

10. The method of claim 8, wherein the short range network utilizes a high frequency, low energy communication protocol.

11. The method of claim 8, further comprising:

causing a user interface of the mobile device to present a challenge question;

receiving the reply from the user interface of the mobile device, wherein the reply includes the correct answer to the challenge question; and sending the reply to the authorization service provider.

12. The method of claim 8, wherein the message includes a request for a token listed in the account, and further comprising:

sending the message to the mobile device by sending to the mobile device the request for the token listed in the account;

receiving from the mobile device a reply message in the reply in response to the request message, the reply message including a token of the mobile device; and sending the reply message to the authorization service provider to verify that the token of the mobile device included in the reply message matches a token listed in the account.

13. The method of claim 8, wherein the short range network utilizes a high frequency, low energy communication protocol.

14. A system, comprising:

a mobile device related to a user account;

a service provider server; and an agent implemented as processor instructions on a computing device; wherein the agent is configured to send login information to the service provider server, and wherein the service provider server is configured to:

compare the login information to the user account to verify the mobile device, perform a proximity check that includes sending a message with user instructions to the mobile device via a first network, receiving a reply including a correct answer based on the user instructions of the message via a second network, the correct answer being different than the user instructions, and send authorization to the agent to approve an exchange of data with an application on the computing device when the mobile device is determined by the proximity check as proximate to the computing device.

15. The system of claim 14, wherein the service provider is a wireless communications service provider and the mobile device is a cellular phone.

16. The system of claim 14, wherein the service provider is an authorization service provider, wherein the mobile device is a cellular phone, and wherein the authorization service provider communicates with a wireless communications provider to verify an account related to the user and the mobile device.

17. The system of claim 14, wherein the mobile device is one of a card or a keyfob, and wherein the mobile device includes a biometric reader.

* * * * *